United States Patent
Wang et al.

(10) Patent No.: US 10,862,735 B2
(45) Date of Patent: Dec. 8, 2020

(54) METHOD AND APPARATUS FOR IMPLEMENTING OPERATION, ADMINISTRATION, AND MAINTENANCE FUNCTION

(71) Applicant: Huawei Technologies Co., Ltd., Shenzhen (CN)

(72) Inventors: Zitao Wang, Nanjing (CN); Qin Wu, Nanjing (CN); Yihong Huang, Nanjing (CN); Liang Xia, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 666 days.

(21) Appl. No.: 15/493,480

(22) Filed: Apr. 21, 2017

(65) Prior Publication Data

US 2017/0222864 A1    Aug. 3, 2017

Related U.S. Application Data

(63) Continuation of application No. PCT/CN2015/088792, filed on Sep. 1, 2015.

(30) Foreign Application Priority Data

Oct. 23, 2014   (CN) .......................... 2014 1 0571176

(51) Int. Cl.
*H04W 24/02* (2009.01)
*H04L 12/24* (2006.01)
(Continued)

(52) U.S. Cl.
CPC .......... *H04L 41/042* (2013.01); *H04L 41/022* (2013.01); *H04L 43/0829* (2013.01);
(Continued)

(58) Field of Classification Search
CPC combination set(s) only.
See application file for complete search history.

(56) References Cited

U.S. PATENT DOCUMENTS

| 8,717,906 B2 | 5/2014 | Sawaguchi |
| 2007/0237156 A1* | 10/2007 | Wang ................. H04L 12/5601 370/395.5 |

(Continued)

FOREIGN PATENT DOCUMENTS

| CN | 101420385 A | 4/2009 |
| CN | 101588367 A | 11/2009 |

(Continued)

OTHER PUBLICATIONS

Nataf, E. et al., "End-to-End YANG-based Configuration Management," IEEE/IFIP Network Operations and Management Symposium, Apr. 19, 2010, pp. 674-684.
(Continued)

*Primary Examiner* — Ayanah S George
(74) *Attorney, Agent, or Firm* — Slater Matsil, LLP

(57) ABSTRACT

The present application discloses a method and an apparatus for implementing an OAM function. In this solution, a unified OAM management center processes, based on a unified OAM management data model, network OAM status information, but the unified OAM management data model is unrelated to a network technology used by a network entity.

22 Claims, 7 Drawing Sheets

(51) Int. Cl.
*H04L 12/26* (2006.01)
*H04L 12/707* (2013.01)

(52) U.S. Cl.
CPC .......... *H04L 45/22* (2013.01); *H04L 41/0266* (2013.01); *H04L 41/0853* (2013.01)

(56) References Cited

U.S. PATENT DOCUMENTS

| | | | | |
|---|---|---|---|---|
| 2007/0274207 | A1* | 11/2007 | Li | H04L 12/437 370/222 |
| 2011/0032817 | A1* | 2/2011 | Qian | H04L 41/147 370/225 |
| 2011/0090783 | A1* | 4/2011 | Huang | H04L 45/22 370/217 |
| 2012/0110028 | A1* | 5/2012 | Athreya | G06F 16/214 707/803 |
| 2012/0271928 | A1* | 10/2012 | Kern | H04L 41/084 709/220 |
| 2016/0048403 | A1* | 2/2016 | Bugenhagen | G06F 9/45558 718/1 |

FOREIGN PATENT DOCUMENTS

| | | | |
|---|---|---|---|
| CN | 103152205 A | * | 6/2013 |
| CN | 103152205 A | | 6/2013 |
| CN | 103369571 A | | 10/2013 |
| WO | 9907109 A1 | | 2/1999 |

OTHER PUBLICATIONS

Stratman, R H: "Development of an Integrated Network Manager for Heterogeneous Networks Using OSI Standards and Object-Oriented Techniques," IEEE Journal on Selected Areas in Communications, vol. 12, No. 6, Aug. 1, 1994, pp. 1110-1120.

Rose, et al., "Concise MIB Definitions," Network Working Group, RFC 1212, Mar. 1991, 19 pages.

Rose, et al., "Structure and Identification of Management Information for TCP/IP-based Internets," Network Working Group, RFC 1155, May 1990, 22 pages.

* cited by examiner

METHOD AND APPARATUS FOR IMPLEMENTING OPERATION, ADMINISTRATION, AND MAINTENANCE FUNCTION

CROSS-REFERENCE TO RELATED APPLICATIONS

This application is a continuation of International Application No. PCT/CN2015/088792, filed on Sep. 1, 2015, which claims priority to Chinese Patent Application No. 201410571176.2, filed on Oct. 23, 2014. The disclosures of the aforementioned applications are hereby incorporated by reference in their entireties.

TECHNICAL FIELD

The present disclosure relates to the field of communications technologies, and in particular, to a method and an apparatus for implementing an operation, administration, and maintenance function.

BACKGROUND

Currently, in an IP (Internet Protocol) bearer network, an OAM (operation, administration, and maintenance) technology has been widely used and deployed, and the OAM technology can be mainly used to implement the following functions: performing performance monitoring, generating maintenance information, and assessing stability of a link according to the information; detecting a network fault by means of regular query, and generating various maintenance and alarm information; bypassing a faulty entity by means of scheduling or switching to another entity, so as to ensure normal operation of the network; and sending fault information to a management network entity.

In the prior art, an OAM management data model in a management network entity is tightly coupled to a corresponding network technology. A new OAM management data model needs to be developed for each new network technology. For example, the OAM management data model is an IP OAM management data model if an IP network technology is used between network entities, the OAM management data model is an ETH (Ethernet) OAM management data model if an ETH network technology is used between network entities, and the OAM management data model is an MPLS (Multiprotocol Label Switching) OAM management data model if an MPLS network technology is used between network entities, as shown in FIG. 1.

With development of communications technologies, diversified technologies are used between network entities. If a new network technology emerges, a new OAM management data model needs to be developed first before an OAM function can be implemented. Therefore, current manners of implementing an OAM function have disadvantages that a long time is to be consumed and flexibility is relatively low.

SUMMARY

Embodiments of the present invention provide a method and an apparatus for implementing an OAM function, so as to resolve disadvantages of poor flexibility and longer time consumption in the prior art.

According to a first aspect, a method for implementing an operation, administration, and maintenance OAM function is provided. The method includes receiving, by a unified OAM management center, detected network OAM status information sent by a network entity. The network OAM status information is received either in a manner that is based on a unified OAM management data model, or is received in a manner that is based on an OAM management data model that corresponds to a network technology used by the network entity. The method further includes processing, based on the unified OAM management data model by the unified OAM management center, the network OAM status information. The unified OAM management data model includes a unified parameter, where the unified parameter is a parameter commonly used in OAM management data models that correspond to different network technologies.

With reference to the first aspect, in a first possible implementation manner, before the processing, based on the unified OAM management data model by the unified OAM management center, the network OAM status information, the method further includes: obtaining, by the unified OAM management center, the unified parameter; and generating, by the unified OAM management center, the unified OAM management data model according to the unified parameter by using an IETF YANG (Internet Engineering Task Force Yet Another Next Generation) Data Model format.

With reference to the first aspect or the first possible implementation manner of the first aspect, in a second possible implementation manner, the receiving the network OAM status information in a manner that is based on the unified OAM management data model specifically includes: receiving, by the unified OAM management center, data that is in an Extensible Markup Language (XML) form and that is transferred by the network entity by using the Network Configuration Protocol (NETCONF), where the data in the XML form is converted from an object of the unified OAM management data model, the object of the unified OAM management data model carries the network OAM status information, and the object of the unified OAM management data model is obtained by the unified OAM management center by filling and/or extending, according to the detected network OAM status information, a related parameter in the unified OAM management data model.

With reference to the first aspect, or the first to the second possible implementation manners of the first aspect, in a third possible implementation manner, before the receiving, by the unified OAM management center, the network OAM status information, the method further includes: sending, by the unified OAM management center, network OAM status detection signaling to the network entity, where the network OAM status detection signaling is generated according to the unified OAM management data model, and is related to the network technology that is used by the network entity.

With reference to the third possible implementation manner of the first aspect, in a fourth possible implementation manner, before the sending, by the unified OAM management center, network OAM status detection signaling to the network entity, the method further includes: receiving, by the unified OAM management center, a network OAM status detection requirement that is sent by an application layer and that is unrelated to a network technology; determining, by the unified OAM management center, a particular feature of the network technology that is used by the network entity; and converting, based on the unified OAM management data model and the particular feature by the unified OAM management center, the network OAM status detection requirement into the network OAM status detection signaling.

With reference to the first aspect, or the first to the fourth possible implementation manners of the first aspect, in a fifth possible implementation manner, the unified OAM management data model further includes one or any combination of the following information: network layer information of network layers included in a path where network OAM status is detected, first correlation information between the network layers that are included in the path, relative position information of the path and another path, and second correlation information between the path and the another path.

With reference to the first aspect, or the first to the fifth possible implementation manners of the first aspect, in a sixth possible implementation manner, the processing, based on the unified OAM management data model by the unified OAM management center, the network OAM status information specifically includes: if the network OAM status information is received in a manner that is based on the unified OAM management data model, determining, by the unified OAM management center according to the object of the unified OAM management data model, that a problem occurs in a first path through which a data stream is transmitted between the network entity and another network entity; and sending, by the unified OAM management center, a notification message to the network entity, so that the network entity switches the data stream from the first path to a second path where no problem occurs for transmission; or if the network OAM status information is received in a manner that is based on the OAM management data model that corresponds to the network technology used by the network entity, converting, based on the unified OAM management data model by the unified OAM management center, the network OAM status information into the object of the unified OAM management data model, and determining, according to the object of the unified OAM management data model, that a problem occurs in a first path through which a data stream is transmitted between the network entity and another network entity; and sending, by the unified OAM management center, a notification message to the network entity, so that the network entity switches the data stream from the first path to a second path where no problem occurs for transmission.

According to a second aspect, a unified operations, administration, and maintenance OAM management center is provided. The unified OAM management center includes a receiving unit. The receiving unit is configured to receive detected network OAM status information sent by a network entity, where the network OAM status information is received in a manner that is based on a unified OAM management data model, or is received in a manner that is based on an OAM management data model that corresponds to a network technology used by the network entity. The unified OAM management center further includes a processing unit configured to process, based on the unified OAM management data model, the network OAM status information. The unified OAM management data model also includes a unified parameter. The unified parameter is a parameter commonly used in OAM management data models that correspond to different network technologies.

With reference to the second aspect, in a first possible implementation manner, the unified OAM management center further includes a generation unit, where the generation unit is configured to: obtain the unified parameter, and generate the unified OAM management data model according to the unified parameter by using an IETF YANG Data Model format.

With reference to the second aspect or the first possible implementation manner of the second aspect, in a second possible implementation manner, the receiving unit is specifically configured to receive data that is in an XML form and that is transferred by the network entity by using the Network Configuration Protocol NETCONF, where the data in the XML form is converted from an object of the unified OAM management data model, the object of the unified OAM management data model carries the network OAM status information, and the object of the unified OAM management data model is obtained by the unified OAM management center by filling and/or extending, according to the detected network OAM status information, a related parameter in the unified OAM management data model.

With reference to the second aspect, or the first to the second possible implementation manners of the second aspect, in a third possible implementation manner, the unified OAM management center further includes a sending unit, where the sending unit is configured to: send network OAM status detection signaling to the network entity, where the network OAM status detection signaling is generated according to the unified OAM management data model, and is related to the network technology that is used by the network entity.

With reference to the third possible implementation manner of the second aspect, in a fourth possible implementation manner, the receiving unit is further configured to receive a network OAM status detection requirement that is sent by an application layer and that is unrelated to a network technology; and the unified OAM management center further includes a conversion unit, configured to: determine a particular feature of the network technology that is used by the network entity; and convert, based on the unified OAM management data model and the particular feature, the network OAM status detection requirement into the network OAM status detection signaling.

With reference to the second aspect, or the first to the fourth possible implementation manners of the second aspect, in a fifth possible implementation manner, the unified OAM management data model further includes one or any combination of the following information: network layer information of network layers included in a path where network OAM status is detected, first correlation information between the network layers that are included in the path, relative position information of the path and another path, and second correlation information between the path and the another path.

With reference to the second aspect, or the first to the fifth possible implementation manners of the second aspect, in a sixth possible implementation manner, the sending unit is further configured to send, to the network entity, OAM configuration information that corresponds to information of an OAM capability supported by the network entity, where the OAM configuration information is generated by adding, based on the unified OAM management data model, configuration information related to the network technology used by the network entity.

With reference to the second aspect, or the first to the sixth possible implementation manners of the second aspect, in a seventh possible implementation manner, if the network OAM status information is received in a manner that is based on the unified OAM management data model, the processing unit is specifically configured to determine, according to the object of the unified OAM management data model, that a problem occurs in a first path through which a data stream is transmitted between the network entity and another network entity; and the unified OAM management center sends a notification message to the network entity, so that the network entity switches the data stream from the first path to a second path where no problem occurs for transmission; or if the network OAM status information is received in a manner that is based on the OAM management data model that corresponds to the network technology used by the network entity, the processing unit is specifically configured to: convert, based on the unified OAM management data model, the network OAM status information into the object of the OAM management data model, and determine, according to the object of the unified OAM management data model, that a problem occurs in a first path through which a data stream is transmitted between the network entity and another network entity; and the unified OAM management center sends a notification message to the network entity, so that the network entity switches the data stream from the first path to a second path where no problem occurs for transmission.

According to a third aspect, a network entity is provided. The network entity includes a detection unit which is configured to detect a network OAM status. The network entity also includes a sending unit which is configured to send detected network OAM status information to a unified OAM management center in a manner that is based on a unified OAM management data model or in a manner that is based on an OAM management data model that corresponds to a network technology used by the network entity. The unified OAM management data model includes a unified parameter, where the unified parameter is a parameter commonly used in OAM management data models that correspond to different network technologies.

With reference to the third aspect, in a first possible implementation manner, the detection unit is specifically configured to: spontaneously detect the network OAM status; or detect the network OAM status according to network OAM status detection signaling sent by the unified OAM management center; and the network entity further includes a receiving unit, where the receiving unit is configured to: receive the network OAM status detection signaling sent by the unified OAM management center, where the network OAM status detection signaling is generated based on the unified OAM management data model by the unified OAM management center and is related to the network technology used by the network entity; and the detection unit is specifically configured to detect the network OAM status according to the network OAM status detection signaling.

With reference to the third aspect or the first possible implementation manner of the third aspect, in a second possible implementation manner, the receiving unit is further configured to receive OAM configuration information that corresponds to information of an OAM capability supported by the network entity and that is sent by the unified OAM management center, where the OAM configuration information is generated by adding, based on the unified OAM management data model, configuration information related to the network technology used by the network entity.

With reference to the third aspect, or the first to the second possible implementation manners of the third aspect, in a third possible implementation manner, the sending unit is specifically configured to send data that is in an XML form and that is transferred by using the Network Configuration Protocol NETCONF, where the data in the XML form is converted from an object of the unified OAM management data model, the unified OAM management data model is generated by using an IETF YANG Data Model format, and the object of the unified OAM management data model carries the network OAM status information.

According to a fourth aspect, an operation, administration, and maintenance system is provided, including the unified OAM management center according to the second aspect or the possible implementation manners of the second aspect, and the network entity according to the third aspect or the possible implementation manners of the third aspect.

According to the embodiments of the present invention, a unified OAM management center processes, based on a unified OAM management data model, network OAM status information, but the unified OAM management data model is unrelated to a network technology used by a network entity. Therefore, flexibility of an OAM function is improved, and time consumption is reduced.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, embodiments of the present invention are described in detail with reference to the accompanying drawings. It should be understood that the embodiments described herein are merely used to illustrate and explain the present disclosure, but are not intended to limit the present disclosure. In addition, the embodiments of the present application and features in the embodiments may be mutually combined in a case in which they do not conflict with each other.

In the following, the embodiments of the present invention are described in detail with reference to the accompanying drawings.

Figures 1, 2A:
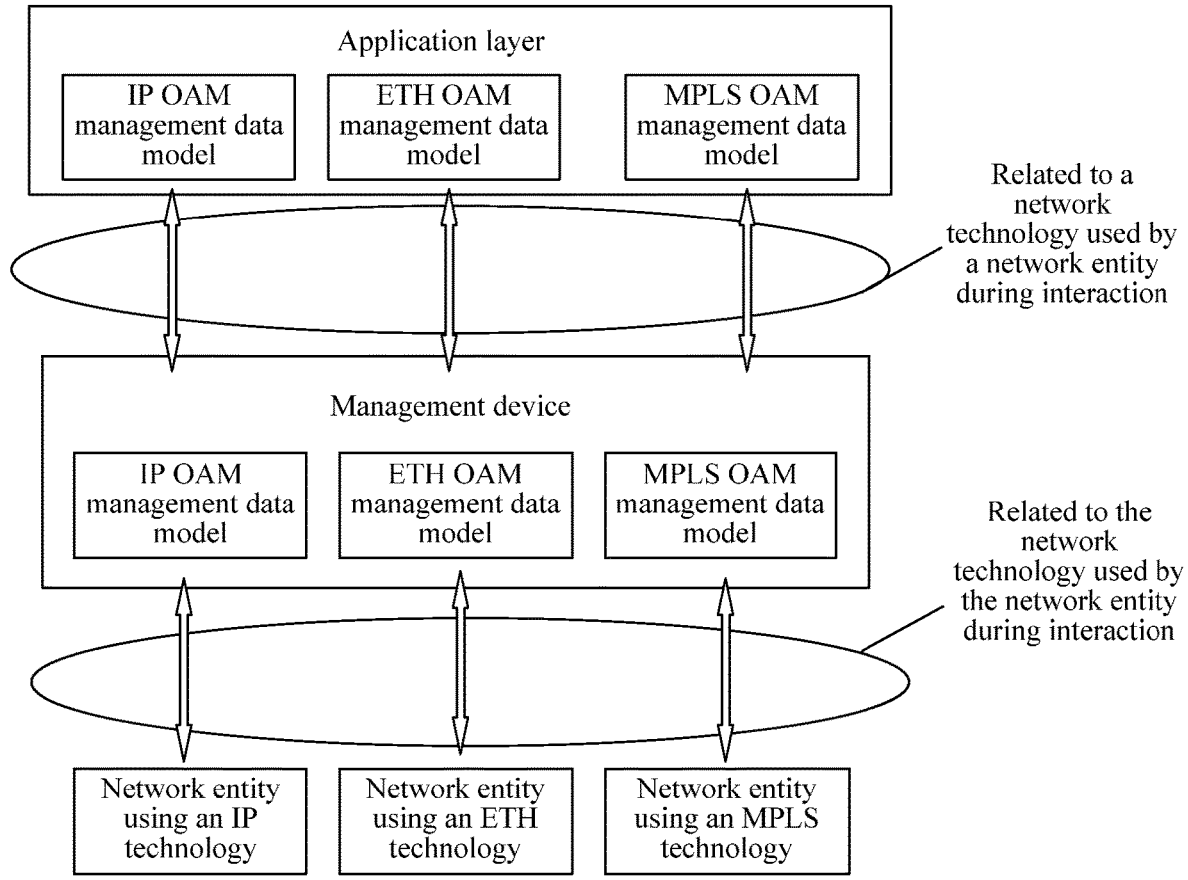
FIG. 1 is a schematic diagram of implementing an OAM function in the prior art.
FIG. 2A is a flowchart of implementing an OAM function according to an embodiment of the present invention.

Referring to FIG. 2A, in an embodiment of the present invention, a detailed procedure of implementing an OAM is as follows.

Step 200: A unified OAM management center receives detected network OAM status information sent by a network entity, where the network OAM status information is received in a manner that is based on a unified OAM management data model, or is received in a manner that is based on an OAM management data model that corresponds to a network technology used by the network entity.

Step 210: The unified OAM management center processes, based on the unified OAM management data model, the network OAM status information, where the unified OAM management data model includes a unified parameter, where the unified parameter is a parameter commonly used in OAM management data models that correspond to different network technologies.

In this embodiment of the present invention, a unified OAM management center collects information of all MPs (maintenance point) in a network that is managed by the unified OAM management center, and information of an MP includes network topology information of the MP and technical information of a used OAM.

In this embodiment of the present invention, the unified OAM management center is disposed to perform unified management on the network. The unified OAM management center is a logical concept, and may be centralized, that is, may be a physically independent network entity, or may be built in a network entity, for example, on multiple switches or routers; or may be distributed, that is, may be multiple physically independent network entities, or may be built in multiple network entities, for example, on multiple switches or routers.

In this embodiment of the present invention, the network entity detects the network OAM status. In fact, an MP in the network entity detects the network OAM status. The MP specifically executes OAM detection or OAM measurement. The MP is also a logical concept, and may be physically disposed on a network entity such as a switch or a router. One or more MPs may be disposed on one network entity, and different OAM technologies may also be used in multiple MPs on one network entity.

In this embodiment of the present invention, before the unified OAM management center processes, based on the unified OAM management data model, the network OAM status information, the unified OAM management center needs to generate the unified OAM management data model. The unified OAM management data model can be generated in a manner in the following: obtaining, by the unified OAM management center, the unified parameter; and generating, by the unified OAM management center, the unified OAM management data model according to the unified parameter by using an IETF YANG Data Model format.

In this embodiment of the present invention, a code format of the unified OAM management data model may be as follows.

```
module: ietf-management-oam
  +--rw domains
    +--rw domain* [md-index]
      +--rw md-index          uint32
      +--rw md-index-next     uint32
      +--rw md-name           string
      +--rw md-level          uint32
      +--rw MEGs!
        +--rw MEG* [meg-index]
          +--rw meg-index                  uint32
          +--rw meg-index-next             uint32
          +--rw meg-name                   string
          +--rw meg-level                  unit32
          +--rw meg-service-pointer-type   uint32
          +--rw meg-mp-location            uint32
          +--rw meg-path-flow              enumeration
          +--rw meg-oper-status            enumeration
          +--rw meg-sub-oper-status        enumeration
          +--rw ME* [me-index]
          | +--rw me-index                 uint32
          | +--rw me-mp-index              uint32
          | +--rw me-index-next            uint32
          | +--rw me-mp-index-next         uint32
          | +--rw me-name?                 string
          | +--rw me-source-mp-index       uint32
          | +--rw me-sink-mp-index         uint32
          | +--rw me-mp-ifindex            InterfaceIndexOrZero
          | +--rw source-mp*               [mp-id]
          | | +--rw me-mp-type             uint32
          | | +--rw mp-id*                 [MEP-id,MIP-id]
          | | | +--rw mep-id               MEP-id
          | | | +--rw mip-id   MIP-id
          | | +--rw (source-mp-addr)?
          | | | +--:(mac-address)
          | | | | +--rw mac-address? yang:mac-address
          | | | +--:(ipv4-address)
          | | | | +--rw ipv4-address? inet:ipv4-address
          | | | +--:(ipv6-address)
          | | | | +--rw ipv6-address? inet:ipv6-address
          | | +--rw session* [session-id]
          | | | +--rw session-index   uint32
          | | | +--rw (session-status)? Uint32
          | | | | +--:(sess-status-null)
```

In this embodiment of the present invention, a network OAM status may include a variety of content such as a state of a link fault and a state of degraded link performance. Optionally, the degraded link performance may refer to one or any combination of a link loss, a link packet loss, reduced link connectivity, or increased link latency. In this embodiment of the present invention, the network entity sends the detected network OAM status information to the unified OAM management center.

In this embodiment of the present invention, there are many manners of receiving based on a unified OAM management data model. Optionally, a manner in the following may be used: receiving, by the unified OAM management center, data that is in an Extensible Markup Language (XML) form and that is transferred by the network entity by using the NETCONF (Network Configuration Protocol).

The data in the XML form is converted from an object of the unified OAM management data model, the object of the unified OAM management data model carries the network OAM status information, and the object of the unified OAM management data model is obtained by the unified OAM management center by filling and/or extending, according to the detected network OAM status information, a related parameter in the unified OAM management data model.

That is, the object of the unified OAM management data model is obtained by filling and/or extending, according to a specific example, a related parameter included in the unified OAM management data model. The specific example may be related to a network technology used by a network entity, or may be unrelated to a network technology used by a network entity. For example, the object of the unified OAM management data model may be obtained by filling and/or extending, according to network OAM status information, a related parameter included in the unified OAM management data model.

In this embodiment of the present invention, rules in existing standards may be used to convert the object of the unified OAM management data model into the data in the XML form. Details are no longer described herein.

In this embodiment of the present invention, the unified OAM management data model is generated by abstracting and extracting a parameter commonly used by OAM management data models that correspond to existing network technologies. The OAM management data models are, for example, an IP OAM management data model, an ETH OAM management data model, and an MPLS OAM management data model, and is decoupled from a specific OAM technology. If a new network technology is developed, the unified OAM management data model described in this embodiment of the present invention may be inherited and extended, and there is no need to generate a brand-new OAM management data model. Therefore, flexibility of implementing an OAM function is improved, and time consumption is reduced.

In this embodiment of the present invention, before the receiving, by the unified OAM management center, the network OAM status information, the procedure may further include the following operation: sending, by the unified OAM management center, network OAM status detection signaling to the network entity.

The network OAM status detection signaling is generated according to the unified OAM management data model, and is related to the network technology that is used by the network entity.

In this embodiment of the present invention, before the sending, by the unified OAM management center, network OAM status detection signaling to the network entity, the procedure further includes: sending an OAM capability request to the network entity; and receiving information of an OAM capability that is supported by the network entity and that is sent by the network entity according to the OAM capability request.

In this embodiment of the present invention, a trigger condition for the sending, by the unified OAM management center, network OAM status detection signaling to the network entity may be that the unified OAM management center spontaneously sends the network OAM status detection signaling, or may be that an application layer sends the network OAM status detection signaling to the unified OAM management center. For example, the unified OAM management center receives a network OAM status detection requirement that is sent by the application layer and that is unrelated to a network technology; the unified OAM management center determines a particular feature of the network technology that is used by the network entity; and the unified OAM management center converts, based on the unified OAM management data model and the particular feature, the network OAM status detection requirement into the network OAM status detection signaling.

Figure 2B:
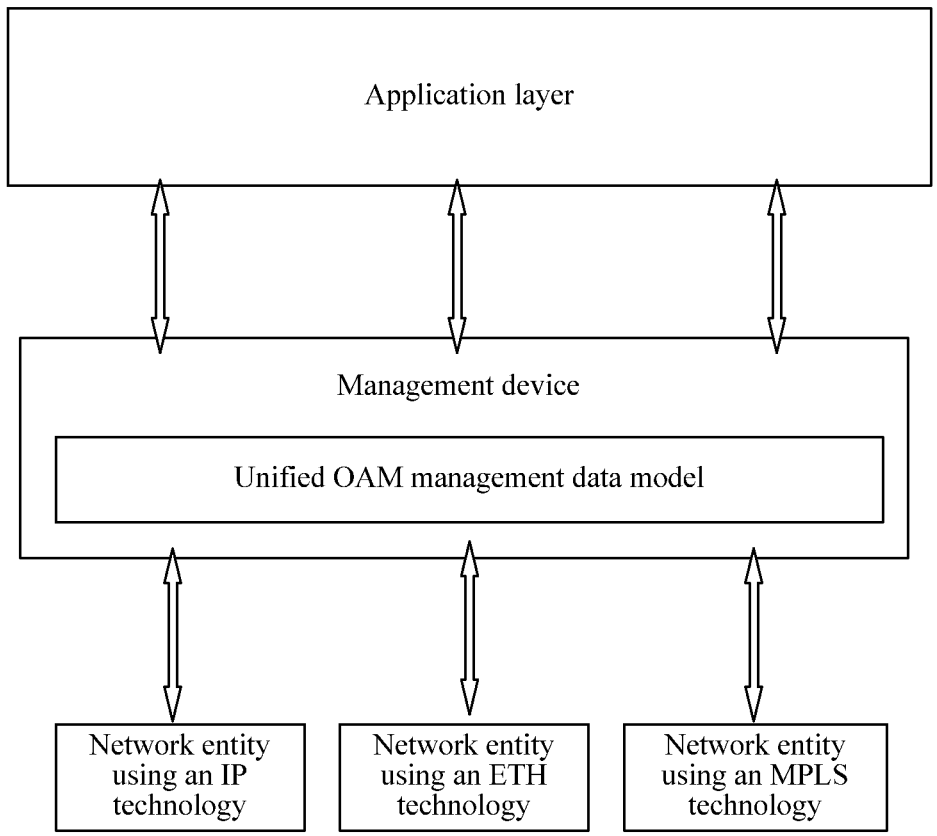
FIG. 2B is a schematic diagram of a relationship among an application layer, a unified OAM management center, and a network entity according to an embodiment of the present invention.

An architecture among an application layer, a unified OAM management data model, and a network entity is shown in FIG. 2B.

For example, the network entity is a network entity in which an IP technology is used. When receiving the network OAM status detection requirement sent by the application layer, the unified OAM management center first determines a destination network entity, determines that a network technology used by the designation network entity is the IP technology, then determines a unique particular feature of the IP technology, and converts, according to a unified OAM management data model and the unique particular feature of the IP technology, the network OAM status detection requirement into the network OAM status detection signaling related to the IP network technology.

In this embodiment of the present invention, the application layer may send, to the unified OAM management center in a manner that is based on the unified OAM management data model, the network OAM status detection requirement unrelated to the specific network technology, or the application layer may send, to the unified OAM management center in a manner that is not based on the unified OAM management data model, the network OAM status detection requirement unrelated to the specific network technology. A specific sending manner is not limited in the present invention, and falls within the protection scope of the present invention.

In the prior art, when the application layer sends the network OAM status detection requirement to the network entity, the application layer needs to know a network technology used by the network entity, and then the application layer converts the network OAM status detection requirement into a network OAM status detection requirement related to the network technology used by the network entity. In this way, the application layer needs to know the network technology used by the network entity that receives the network OAM status detection requirement. However, in this embodiment of the present invention, the application layer does not need to know the network technology used by the network entity that receives the network OAM status detection requirement, and the unified OAM management center can convert the network OAM status detection requirement into the network OAM status detection signaling, so as to implement unified management, and eliminate dependence of the application layer on the specific network technology.

For example, in the prior art, when a network entity that needs to use an IP network technology executes a continuity check (CC) function, a network OAM status detection requirement carries information about a destination IP address, a destination IP port, and Bidirectional Forwarding Detection (BFD); when a network entity that needs to use an ETH network technology executes a CC function, a network OAM status detection requirement carries information about a destination ETH address, a destination ETH port, and MPLS BFD. However, in this embodiment of the present invention, an identifier of the network entity may be carried, and the unified OAM management center determines, based on the identifier of the network entity, corresponding information.

In this embodiment of the present invention, the unified OAM management center can implement, based on the unified OAM management data model, functions such as CC, connectivity verification (CV), performance monitoring (PM), and Path Discovery.

In this embodiment of the present invention, the unified OAM management data model further includes one or any combination of the following information: network layer information of network layers included in a path where network OAM status is detected, first correlation information between the network layers that are included in the path, relative position information of the path and another path, and second correlation information between the path and the another path, so that the unified OAM management center can support inter-layer and inter-domain OAM interaction, thereby implementing inter-layer and inter-domain OAM fault detection.

In this embodiment of the present invention, before the unified OAM management center receives an object of the unified OAM management data model or a network OAM status, the procedure further includes the following operations: sending, by the unified OAM management center to the network entity, OAM configuration information that corresponds to information of an OAM capability supported by the network entity.

The OAM configuration information is generated by adding, based on the unified OAM management data model, configuration information related to the network technology used by the network entity.

In this embodiment of the present invention, when the unified OAM management center processes, based on the unified OAM management data model, the network OAM status information, a manner in the following may be used: if the network OAM status information is received in a manner that is based on the unified OAM management data model, determining, by the unified OAM management center according to the object of the unified OAM management data model, that a problem occurs in a first path through which a data stream is transmitted between the network entity and another network entity; and sending, by the unified OAM management center, a notification message to the network entity, so that the network entity switches the data stream from the first path to a second path where no problem occurs for transmission; or if the network OAM status information is received in a manner that is based on the OAM management data model that corresponds to the network technology used by the network entity, converting, based on the unified OAM management data model by the unified OAM management center, the network OAM status information into the object of the unified OAM management data model, and determining, according to the object of the unified OAM management data model, that a problem occurs in a first path through which a data stream is transmitted between the network entity and another network entity; and sending, by the unified OAM management center, a notification message to the network entity, so that the network entity switches the data stream from the first path to a second path where no problem occurs for transmission.

Figure 2C:
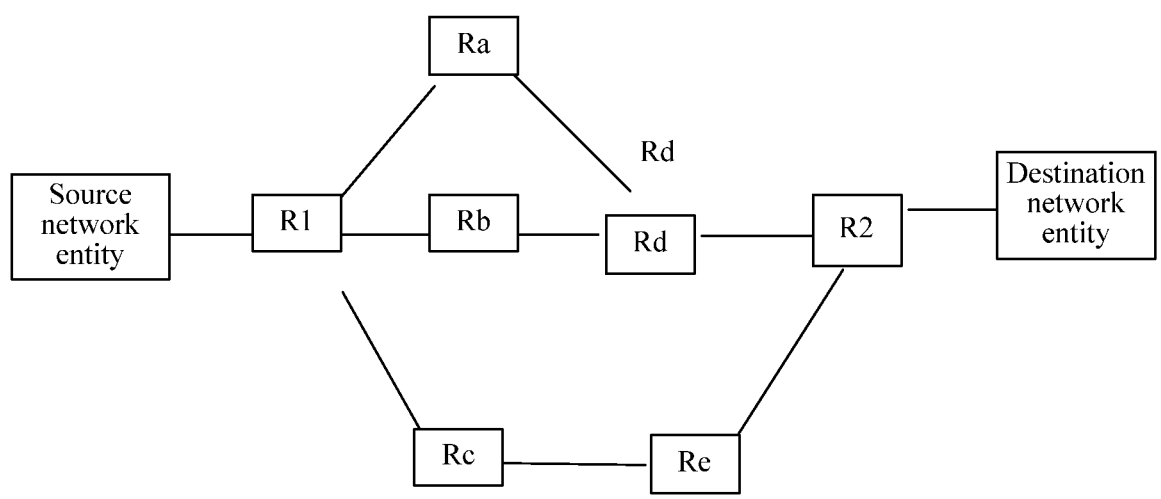
FIG. 2C is a schematic diagram of a unified OAM management center and an MP (maintenance point) according to an embodiment of the present invention.

As shown in FIG. 2C, there are three paths between a source network entity and a destination network entity: a path 1: R1-Ra-Rd-R2, a path 2: R1-Rb-Rd-R2, and a path 3: R1-Rc-Re-R2. If a data stream between the source network entity and the destination network entity is transmitted through the path 1, when the unified OAM management center determines, according to an object of a unified OAM management data model sent by R1, that a problem occurs in the path 1, where the problem may be a performance problem, a packet loss problem, or the like, the unified OAM management center sends a notification message to R1, and then R1 switches the data stream from the path 1 to either the path 2 or the path 3 where no problem occurs.

In this embodiment of the present invention, there are many manners in which the unified OAM management center processes, based on the unified OAM management data model, the network OAM status information. Optionally, a manner in the following may be used: performing inter-domain and inter-layer summarization, correlation and unified analysis according to network layer information, first correlation information, relative position information, and second correlation information to present an end-to-end OAM view.

In this embodiment of the present invention, there are many manners of presenting the end-to-end OAM view. Optionally, a manner in the following may be used: presenting network layer information of a network layer of a path where a network fault or defect occurs in the network and/or relative position information of the path and another path; or presenting a network end-to-end performance monitoring result.

In this embodiment of the present invention, after the performing inter-domain and inter-layer summarization, correlation and unified analysis according to network layer information, first correlation information, relative position information, the procedure further includes: executing unified OAM scheduling.

In this embodiment of the present invention, there are many manners of executing the unified OAM scheduling. Optionally, a manner in the following may be used: determining a correlated network layer according to the first correlation information; and/or determining a correlated path according to the second correlation information; determining a correlated network entity according to the correlated network layer and/or the correlated path and the relative position information; and delivering, to the correlated network entity, network OAM status detection signaling that is related to a network technology used by the correlated network entity, so as to enable the correlated network entity to execute an OAM function, and sending a result after the OAM function is executed.

Figure 3:
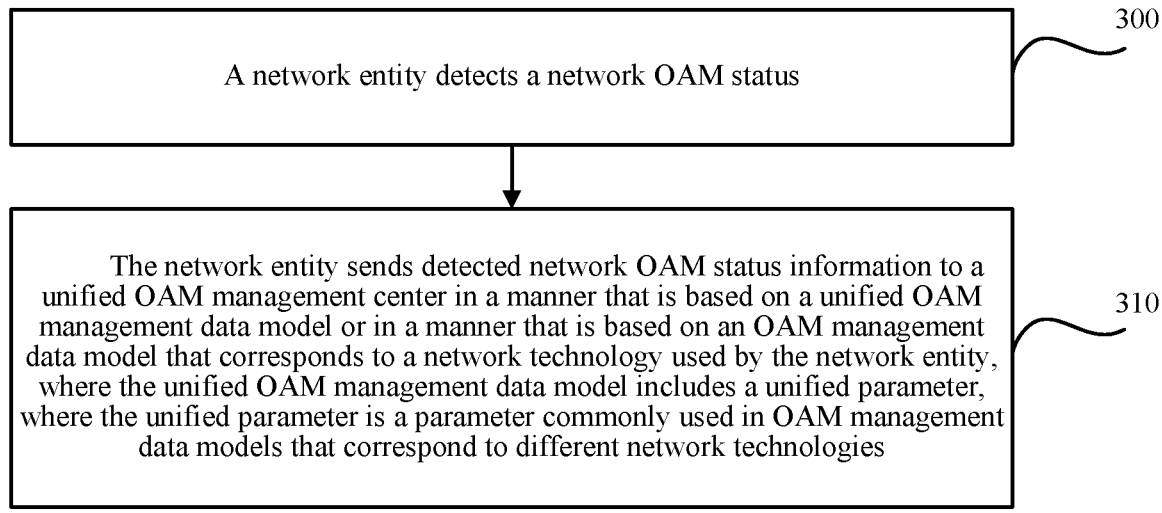
FIG. 3 is another flowchart of implementing an OAM function according to an embodiment of the present invention.

Referring to FIG. 3, in an embodiment of the present invention, another detailed procedure of implementing an OAM function is as follows.

Step 300: A network entity detects a network OAM status.

Step 310: The network entity sends detected network OAM status information to a unified OAM management center in a manner that is based on a unified OAM management data model or in a manner that is based on an OAM management data model that corresponds to a network technology used by the network entity, where the unified OAM management data model includes a unified parameter, where the unified parameter is a parameter commonly used in OAM management data models that correspond to different network technologies.

In this embodiment of the present invention, a network OAM status may include a variety of content such as a state of a link fault and a state of degraded link performance. Optionally, the degraded link performance may refer to one or any combination of a link loss, a link packet loss, reduced link connectivity, or increased link latency. In this embodiment of the present invention, the network entity sends the detected network OAM status information to the unified OAM management center.

In this embodiment of the present invention, there are many manners of triggering the network entity to detect the network OAM status. Optionally, a manner in the following may be used: spontaneously detecting, by the network entity, the network OAM status.

Alternatively, the unified OAM management center may trigger detection of the network OAM status. During implementation, a manner in the following may be used: receiving, by the network entity, the network OAM status detection signaling sent by the unified OAM management center, where the network OAM status detection signaling is generated based on the unified OAM management data model by the unified OAM management center and is related to the network technology used by the network entity; and detecting, by the network entity, the network OAM status according to the network OAM status detection signaling.

Certainly, there is another trigger condition, which is not described in detail herein.

Optionally, OAM configuration information that corresponds to information of an OAM capability supported by the network entity and that is sent by the unified OAM management center is also received.

The OAM configuration information is generated by adding, based on the unified OAM management data model, configuration information related to the network technology used by the network entity.

In this embodiment of the present invention, before the receiving, by the network entity, the network OAM status detection signaling sent by the unified OAM management center, the procedure may further include the following operations: receiving, by the network entity, an OAM capability request sent by the unified OAM management center; and sending, by the network entity to the unified OAM management center according to the OAM capability request, information of an OAM capability supported by the network entity.

In this embodiment of the present invention, optionally, the information of the OAM capability includes information such as an OAM function supported by the network entity, a network bearer protocol supported by the network entity, whether multicast OAM is supported by the network entity, and the like. Certainly, other information may also be included. Details are no longer described herein.

In this embodiment of the present invention, the unified OAM management center collects information of all MPs in a network that is managed by the unified OAM management center, and information of an MP includes network topology information of the MP and technical information of a used OAM.

In this embodiment of the present invention, the unified OAM management center is disposed to perform unified management on the network. The unified OAM management center is a logical concept, and may be centralized, that is, may be a physically independent network entity, or may be built in a network entity, for example, on multiple switches or routers; or may be distributed, that is, may be multiple physically independent network entities, or may be built in multiple network entities, for example, on multiple switches or routers.

In this embodiment of the present invention, the network entity detects the network OAM status. In fact, an MP in the network entity detects the network OAM status. The MP specifically executes OAM detection or OAM measurement. The MP is also a logical concept, and may be physically disposed on a network entity such as a switch or a router. One or more MPs may be disposed on one network entity, and different OAM technologies may also be used in multiple MPs on one network entity.

In this embodiment of the present invention, optionally, the unified OAM management data model may be generated in a manner in the following, for example: obtaining the parameter commonly used in OAM management data models that correspond to different network technologies; and generating the unified OAM management data model according to the obtained parameter by using an IETF YANG Data Model format.

In this embodiment of the present invention, a code format of the unified OAM management data model may be as follows.

```
module: ietf-management-oam
   +--rw domains
      +--rw domain* [md-index]
         +--rw md-index   uint32
         +--rw md-index-next uint32
         +--rw md-name    string
         +--rw md-level   uint32
         +--rw MEGs!
            +--rw MEG* [meg-index]
               +--rw meg-index      uint32
               +--rw meg-index-next uint32
               +--rw meg-name       string
               +--rw meg-level      unit32
               +--rw meg-service-pointer-type uint32
               +--rw meg-mp-location uint32
               +--rw meg-path-flow  enumeration
               +--rw meg-oper-status enumeration
               +--rw meg-sub-oper-status enumeration
               +--rw ME* [me-index]
               | +--rw me-index uint32
               | +--rw me-mp-index  uint32
               | +--rw me-index-next uint32
               | +--rw me-mp-index-next uint32
               | +--rw me-name? string
               | +--rw me-source-mp-index uint32
               | +--rw me-sink-mp-index uint32
               | +--rw me-mp-ifindex   InterfaceIndexOrZero
               | +--rw source-mp* [mp-id]
               | | +--rw me-mp-type  uint32
               | | +--rw mp-id* [MEP-id,MIP-id]
               | | | +--rw mep-id   MEP-id
               | | | +--rw mip-id   MIP-id
               | | +--rw (source-mp-addr)?
               | | | +--:(mac-address)
               | | | | +--rw mac-address? yang:mac-address
               | | | +--:(ipv4-address)
               | | | | +--rw ipv4-address? inet:ipv4-address
               | | | +--:(ipv6-address)
               | | | | +--rw ipv6-address? inet:ipv6-address
               | | +--rw session* [session-id]
               | | | +--rw session-index uint32
               | | | +--rw (session-status)? Uint32
               | | | | +--:(sess-status-null)
```

In this embodiment of the present invention, the object of the unified OAM management data model is obtained by filling and/or extending, according to a specific example, a related parameter included in the unified OAM management data model. The specific example may be related to a specific network technology used by an MP, or may be unrelated to the specific network technology used by an MP. For example, the object of the unified OAM management data model may be obtained by filling and/or extending, according to network OAM status information, a related parameter included in the unified OAM management data model. In this embodiment of the present invention, furthermore, the object of the unified OAM management data model may further be converted into data in an XML form, and then the data in the XML form is transferred to the unified OAM management center by using the NETCONF. Rules of existing criteria may be used to convert the object of the unified OAM management data model into the data in the XML form. Details are no longer described herein. In this embodiment of the present invention, to improve efficiency of OAM processing, the unified OAM management data model further includes one or any combination of the following information: network layer information of network layers included in a path where network OAM status is detected, first correlation information between the network layers that are included in the path, relative position information of the path and another path, and second correlation information between the path and the another path, so that the network OAM status information can be rapidly processed according to the network layer information, the first correlation information, the relative position information, and the second correlation information.

In this embodiment of the present invention, the unified OAM management data model is generated by abstracting and extracting a parameter commonly used by OAM management data models that correspond to existing network technologies, where the OAM management data models are, for example, an IP OAM management data model, an ETH OAM management data model, and an MPLS OAM management data model, and is decoupled from a specific OAM technology. If a new network technology is developed, the unified OAM management data model described in this embodiment of the present invention may be inherited and extended, and there is no need to generate a brand-new OAM management data model. A unified OAM management center processes network OAM status information based on the unified OAM management data model. However, the unified OAM management data model is unrelated to a network technology used by a network entity. Therefore, flexibility of implementing an OAM function is improved, and time consumption is reduced.

Figure 4A:
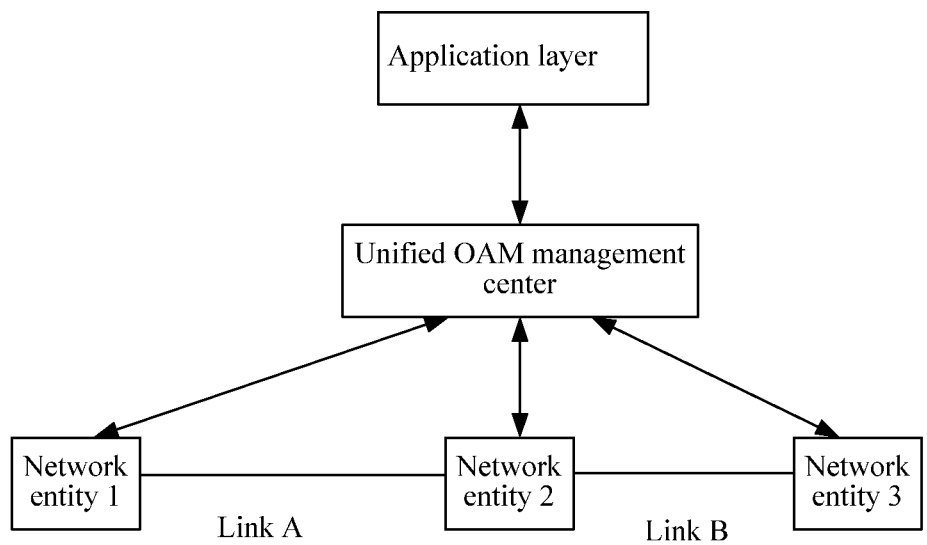
FIG. 4A is a diagram of an application scenario of an embodiment in which an OAM function is implemented according to this embodiment of the present invention.
Figure 4B:
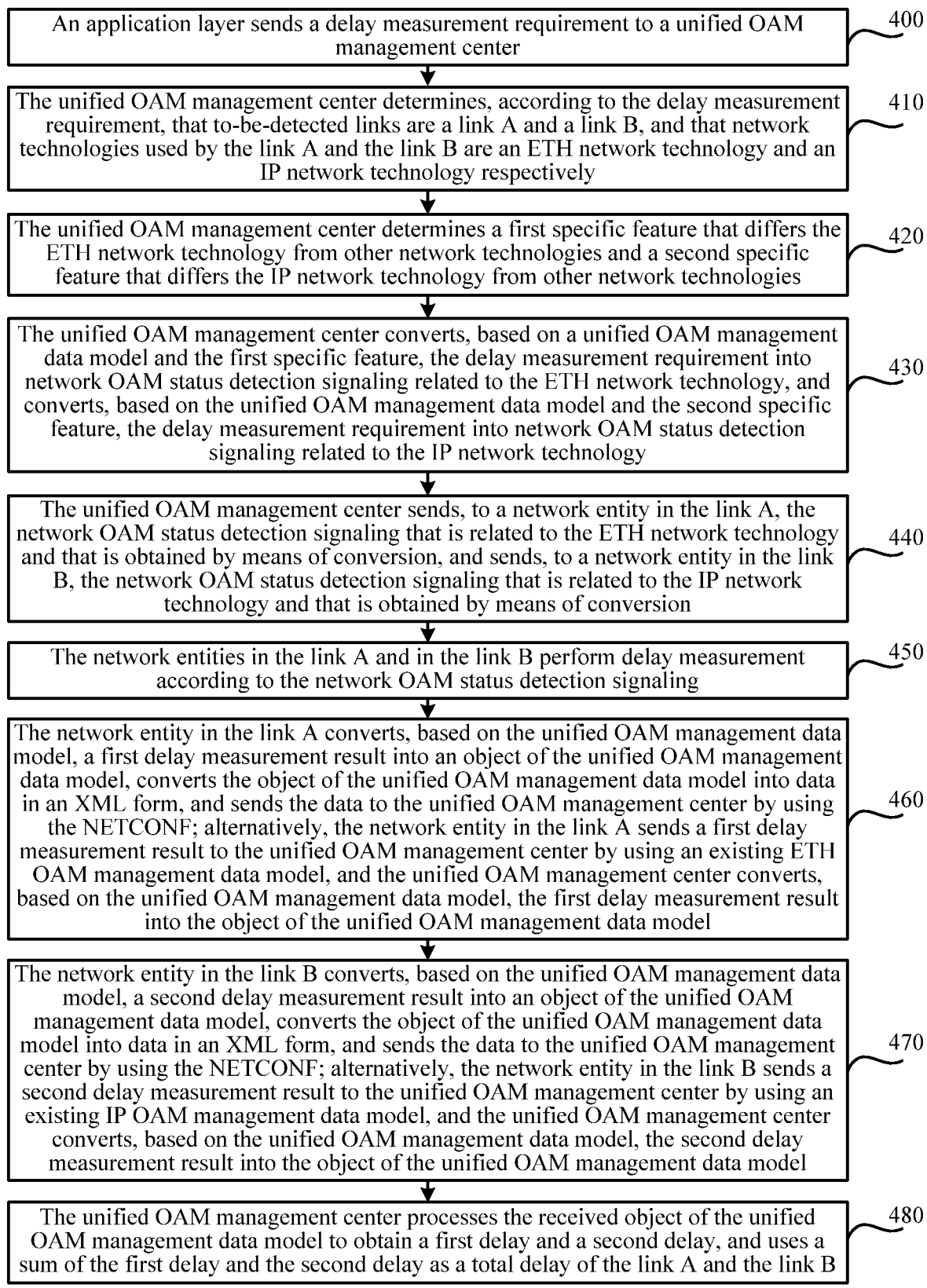
FIG. 4B shows an embodiment in which an OAM function is implemented according to this embodiment of the present invention.

To better understand this embodiment of the present invention, a specific application scenario is provided below, as shown in FIG. 4A. A process for implementing an OAM function is further described in detail, as shown in FIG. 4B.

Step 400: An application layer sends a delay measurement requirement to a unified OAM management center.

In this step, the delay measurement requirement is unrelated to a network technology.

Step 410: The unified OAM management center determines, according to the delay measurement requirement, that to-be-detected links are a link A and a link B, and that network technologies used by the link A and the link B are an ETH network technology and an IP network technology respectively.

Step 420: The unified OAM management center determines a first particular feature that differs the ETH network technology from other network technologies and a second particular feature that differs the IP network technology from other network technologies.

Step 430: The unified OAM management center converts, based on a unified OAM management data model and the first particular feature, the delay measurement requirement into network OAM status detection signaling related to the ETH network technology, and converts, based on the unified OAM management data model and the second particular feature, the delay measurement requirement into network OAM status detection signaling related to the IP network technology.

Step 440: The unified OAM management center sends, to a network entity in the link A, the network OAM status detection signaling that is related to the ETH network technology and that is obtained by means of conversion, and sends, to a network entity in the link B, the network OAM status detection signaling that is related to the IP network technology and that is obtained by means of conversion.

Step 450: The network entities in the link A and in the link B perform delay measurement according to the network OAM status detection signaling.

Step 460: The network entity in the link A converts, based on the unified OAM management data model, a first delay measurement result into an object of the unified OAM management data model, converts the object of the unified OAM management data model into data in an XML form, and sends the data to the unified OAM management center by using the NETCONF; alternatively, the network entity in the link A sends a first delay measurement result to the unified OAM management center by using an existing ETH OAM management data model, and the unified OAM management center converts, based on the unified OAM management data model, the first delay measurement result into the object of the unified OAM management data model.

Step 470: The network entity in the link B converts, based on the unified OAM management data model, a second delay measurement result into an object of the unified OAM management data model, converts the object of the unified OAM management data model into data in an XML form, and sends the data to the unified OAM management center by using the NETCONF; alternatively, the network entity in the link B sends a second delay measurement result to the unified OAM management center by using an existing IP OAM management data model, and the unified OAM management center converts, based on the unified OAM management data model, the second delay measurement result into the object of the unified OAM management data model.

Step 480: The unified OAM management center processes the received object of the unified OAM management data model to obtain a first delay and a second delay, and uses a sum of the first delay and the second delay as a total delay of the link A and the link B.

Figure 5A:
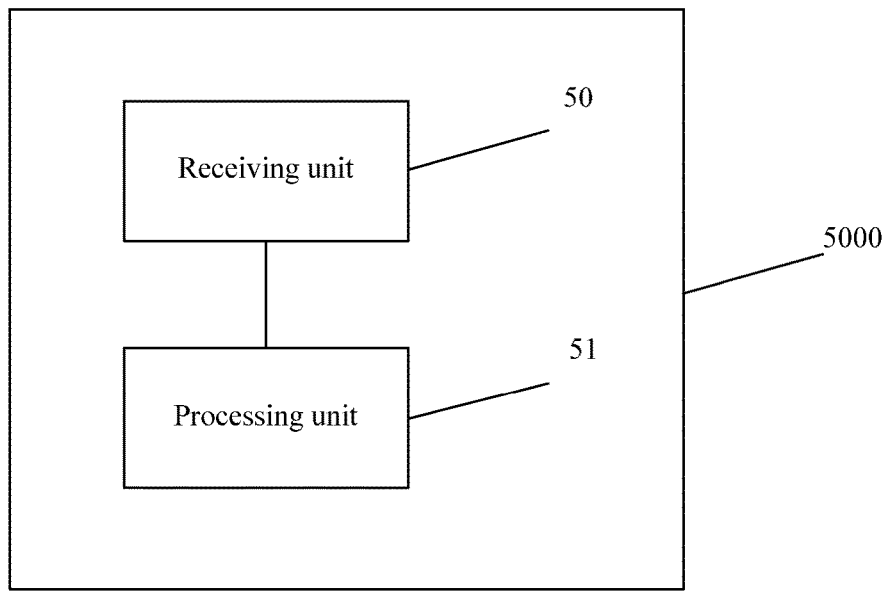
FIG. 5A is a schematic structural diagram of a unified OAM management center according to an embodiment of the present invention.

Based on the technical solutions of the foregoing corresponding methods, referring to FIG. 5A, an embodiment of the present invention provides a unified OAM management center 5000. The unified OAM management center 5000 includes a receiving unit 50 and a processing unit 51.

The receiving unit 50 is configured to receive detected network OAM status information sent by a network entity, where the network OAM status information is received in a manner that is based on a unified OAM management data model, or is received in a manner that is based on an OAM management data model that corresponds to a network technology used by the network entity.

The processing unit 51 is configured to process, based on the unified OAM management data model, the network OAM status information.

The unified OAM management data model includes a unified parameter, where the unified parameter is a parameter commonly used in OAM management data models that correspond to different network technologies.

In this embodiment of the present invention, furthermore, a generation unit is further included. The generation unit is configured to: obtain the unified parameter, and generate the unified OAM management data model according to the unified parameter by using an IETF YANG Data Model format.

In this embodiment of the present invention, optionally, the receiving unit 50 is specifically configured to receive data that is in an XML form and that is transferred by the network entity by using the NETCONF.

The data in the XML form is converted from an object of the unified OAM management data model, the object of the unified OAM management data model carries the network OAM status information, and the object of the unified OAM management data model is obtained by the unified OAM management center by filling and/or extending, according to the detected network OAM status information, a related parameter in the unified OAM management data model.

In this embodiment of the present invention, furthermore, a sending unit is further included. The sending unit is configured to send network OAM status detection signaling to the network entity.

The network OAM status detection signaling is generated according to the unified OAM management data model, and is related to the network technology that is used by the network entity.

In this embodiment of the present invention, furthermore, the receiving unit 50 is further configured to receive a network OAM status detection requirement that is sent by an application layer and that is unrelated to a network technology.

The unified OAM management center further includes a conversion unit, configured to: determine a particular feature of the network technology that is used by the network entity; and convert, based on the unified OAM management data model and the particular feature, the network OAM status detection requirement into the network OAM status detection signaling.

In this embodiment of the present invention, optionally, the unified OAM management data model further includes one or any combination of the following information: network layer information of network layers included in a path where network OAM status is detected, first correlation information between the network layers that are included in the path, relative position information of the path and another path, and second correlation information between the path and the another path.

In this embodiment of the present invention, furthermore, the sending unit is further configured to send, to the network entity, OAM configuration information that corresponds to information of an OAM capability supported by the network entity.

The OAM configuration information is generated by adding, based on the unified OAM management data model, configuration information related to the network technology used by the network entity.

In this embodiment of the present invention, optionally, if the network OAM status information is received in a manner that is based on the unified OAM management data model, the processing unit 51 is specifically configured to determine, according to the object of the unified OAM management data model, that a problem occurs in a first path through which a data stream is transmitted between the network entity and another network entity; and the unified OAM management center sends a notification message to the network entity, so that the network entity switches the data stream from the first path to a second path where no problem occurs for transmission; or if the network OAM status information is received in a manner that is based on the OAM management data model that corresponds to the network technology used by the network entity, the processing unit 51 is specifically configured to: convert, based on the unified OAM management data model, the network OAM status information into the object of the OAM management data model, and determine, according to the object of the unified OAM management data model, that a problem occurs in a first path through which a data stream is transmitted between the network entity and another network entity; and the unified OAM management center sends a notification message to the network entity, so that the network entity switches the data stream from the first path to a second path where no problem occurs for transmission.

Figure 5B:
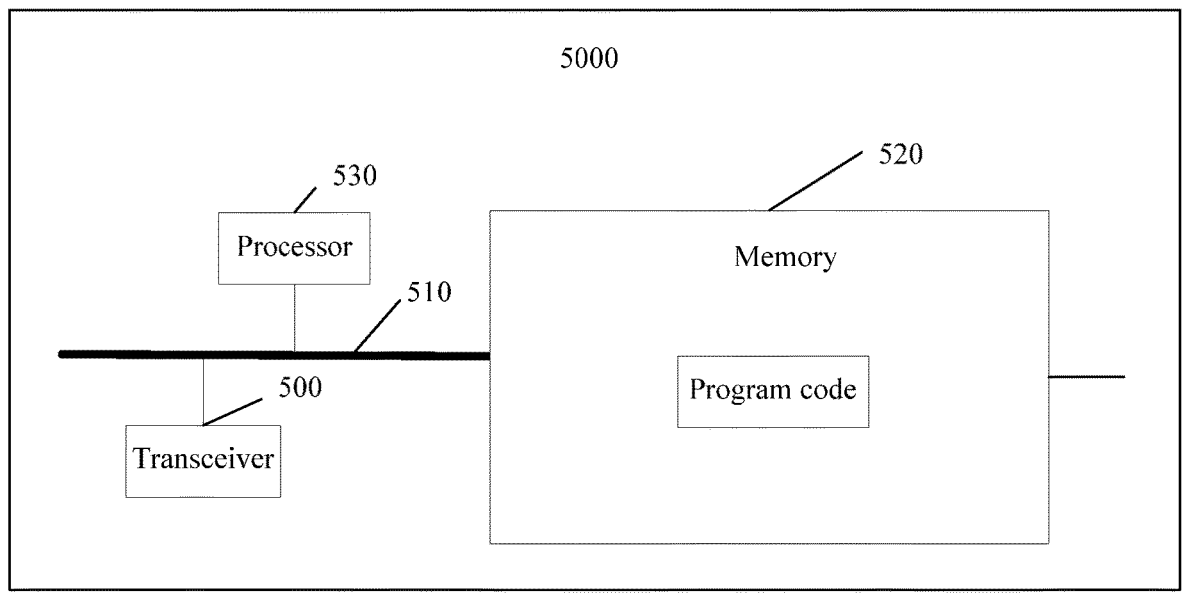
FIG. 5B is another schematic structural diagram of a unified OAM management center according to an embodiment of the present invention.

As shown in FIG. 5B, FIG. 5B is another schematic structural diagram of a unified OAM management center 5000 according to an embodiment of the present invention.

The apparatus includes a transceiver 500, a communications bus 510, a memory 520, and a processor 530.

The transceiver 500 is configured to receive detected network OAM status information sent by a network entity, where the network OAM status information is received in a manner that is based on a unified OAM management data model, or is received in a manner that is based on an OAM management data model that corresponds to a network technology used by the network entity.

The communications bus 510 is configured to perform connection and communication between the processor 530, the transceiver 500, and the memory 520.

The memory 520 is configured to store program code.

The processor 530 is configured to invoke the program code stored in the memory 520, and execute the following operation: processing, based on the unified OAM management data model, the network OAM status information.

The unified OAM management data model includes a unified parameter, where the unified parameter is a parameter commonly used in OAM management data models that correspond to different network technologies.

Figure 6A:
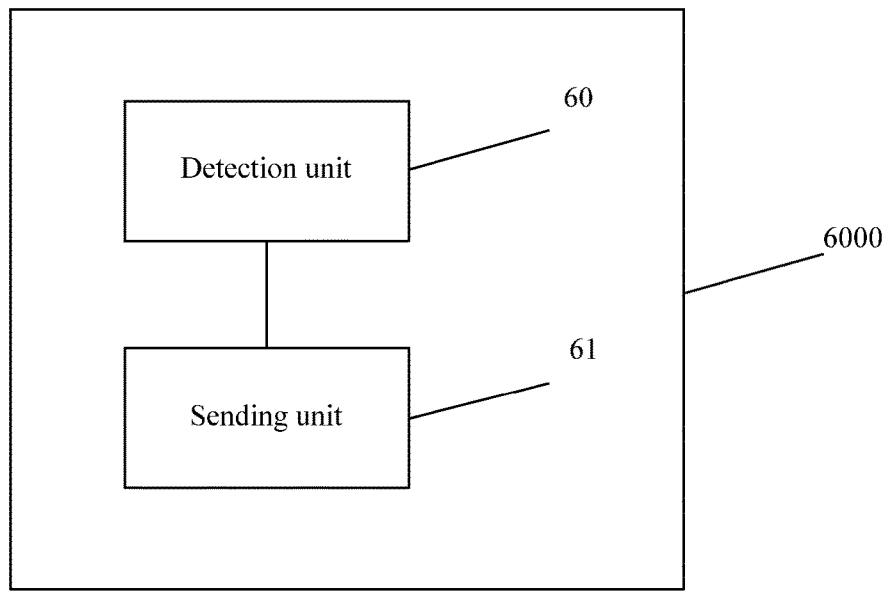
FIG. 6A is a schematic structural diagram of a network entity according to an embodiment of the present invention.

As shown in FIG. 6A, FIG. 6 is a schematic structural diagram of a network entity 6000 according to an embodiment of the present invention. The apparatus includes a detection unit 60 and a sending unit 61.

The detection unit 60 is configured to detect a network OAM status.

The sending unit 61 is configured to send detected network OAM status information to a unified OAM management center in a manner that is based on a unified OAM management data model or in a manner that is based on an OAM management data model that corresponds to a network technology used by the network entity.

The unified OAM management data model includes a unified parameter, where the unified parameter is a parameter commonly used in OAM management data models that correspond to different network technologies.

In this embodiment of the present invention, optionally, the detection unit 60 is specifically configured to spontaneously detect the network OAM status; or detect the network OAM status according to network OAM status detection signaling sent by the unified OAM management center; and the network entity further includes a receiving unit, where the receiving unit is configured to: receive the network OAM status detection signaling sent by the unified OAM management center, where the network OAM status detection signaling is generated based on the unified OAM management data model by the unified OAM management center and is related to the network technology used by the network entity.

The detection unit 60 is specifically configured to detect the network OAM status according to the network OAM status detection signaling.

In this embodiment of the present invention, furthermore, the receiving unit is further configured to receive OAM configuration information that corresponds to information of an OAM capability supported by the network entity and that is sent by the unified OAM management center.

The OAM configuration information is generated by adding, based on the unified OAM management data model, configuration information related to the network technology used by the network entity.

In this embodiment of the present invention, optionally, the sending unit 61 is specifically configured to send data that is in an XML form and that is transferred by using the NETCONF. The data in the XML form is converted from an object of the unified OAM management data model, the object of the unified OAM management data model is generated by using an IETF YANG Data Model format, and the object of the unified OAM management data model carries network OAM status information.

Figure 6B:
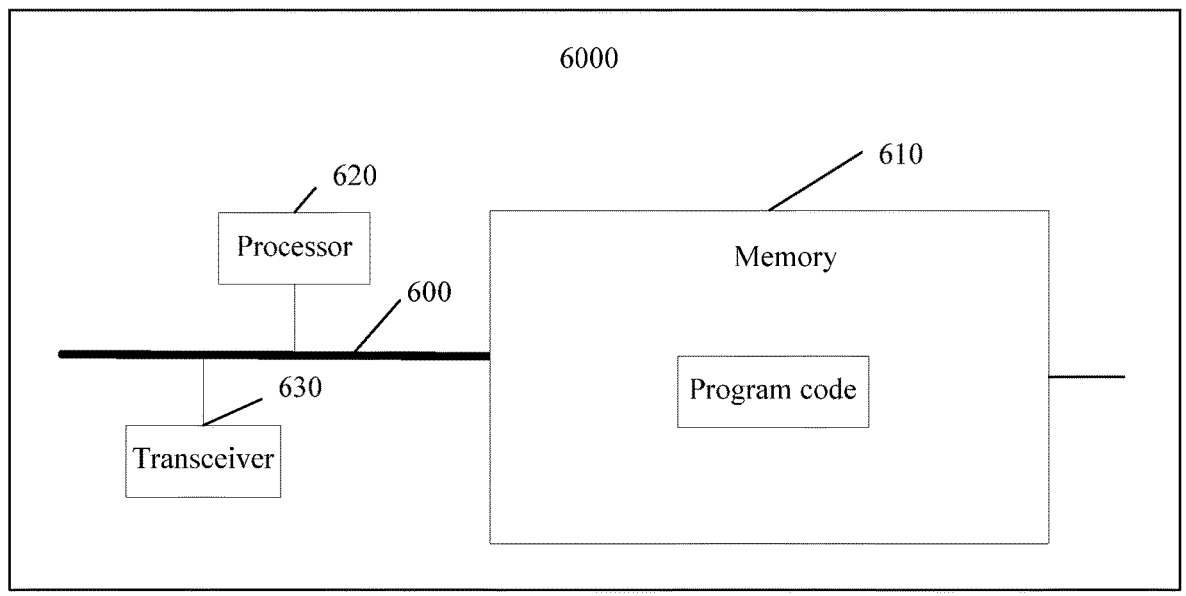
FIG. 6B is another schematic structural diagram of a network entity according to an embodiment of the present invention.

As shown in FIG. 6B, FIG. 6B is another schematic structural diagram of a network entity 6000 according to an embodiment of the present invention. The apparatus includes a communications bus 600, a memory 610, a processor 620, and a transceiver 630.

The communications bus 600 is configured to perform connection and communication between the processor 620, the transceiver 630, and the memory 610.

The memory 610 is configured to store program code.

The processor 620 is configured to invoke the program code stored in the memory 610, and execute the following operation: detecting a network OAM status.

The transceiver 630 is configured to send detected network OAM status information to a unified OAM management center in a manner that is based on a unified OAM management data model or in a manner that is based on an OAM management data model that corresponds to a network technology used by the network entity.

The unified OAM management data model includes a unified parameter, where the unified parameter is a parameter commonly used in OAM management data models that correspond to different network technologies.

Figure 7:
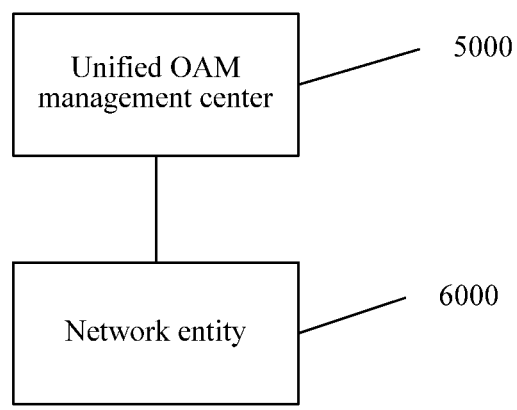
FIG. 7 is a schematic structural diagram of an operation, administration, and maintenance system according to an embodiment of the present invention.

As shown in FIG. 7, FIG. 7 is a schematic structural diagram of an operation, administration, and maintenance system according to an embodiment of the present invention. The system includes a unified OAM management center 5000 and a network entity 6000.

Based on the above, in this embodiment of the present invention, a unified OAM management center processes, based on a unified OAM management data model, network OAM status information, but the unified OAM management data model is unrelated to a network technology used by a network entity. Therefore, flexibility of an OAM function is improved, and time consumption is reduced.

The present invention is described with reference to the flowcharts and/or block diagrams of the method, the network entity (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing network entity to generate a machine, so that the instructions executed by a computer or a processor of any other programmable data processing network entity generate an apparatus for implementing a function in one or more processes in the flowcharts and/or in one or more blocks in the block diagrams.

These computer program instructions may also be stored in a computer readable memory that can instruct the computer or any other programmable data processing network entity to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing network entity, so that a series of operations and steps are performed on the computer or the another programmable network entity, thereby generating computer-implemented processing. Therefore, the instructions executed on the computer or the another programmable network entity provide steps for implementing a function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to embodiments of the present invention without departing from the scope of the embodiments of the present invention. The present invention is intended to cover these modifications and variations provided that they fall within the scope of protection defined by the following claims and their equivalent technologies.

What is claimed is:

1. A method, comprising:
   receiving, by a unified operation, administration, and maintenance (OAM) management center, network OAM status information sent by a network entity, wherein the network OAM status information is based on a unified OAM management data model or is based on an OAM management data model corresponding to a network technology used by the network entity, and the network OAM status information describes a network OAM status detected by the network entity; and
   processing, by the unified OAM management center, the network OAM status information based on the unified OAM management data model;
   wherein the unified OAM management data model comprises a unified parameter, wherein the unified parameter is a parameter of an OAM management data model corresponding to different network technologies.

2. The method according to claim 1, wherein before processing the network OAM status information, the method further comprises:
   obtaining, by the unified OAM management center, the unified parameter; and
   generating, by the unified OAM management center, the unified OAM management data model according to the unified parameter by using an Internet Engineering Task Force Yet Another Next Generation (IETF YANG) Data Model format.

3. The method according to claim 1, wherein receiving the network OAM status information comprises:
   receiving, by the unified OAM management center, data that is in an Extensible Markup Language (XML) form and that is transferred by the network entity using a Network Configuration Protocol (NETCONF);
   wherein the data in the XML form is converted from an object of the unified OAM management data model, wherein the object of the unified OAM management data model carries the network OAM status information, and the object of the unified OAM management data model is obtained by the unified OAM management center by filling and/or extending, according to the detected network OAM status information, a related parameter in the unified OAM management data model.

4. The method according to claim 1, wherein before receiving the network OAM status information, the method further comprises:
sending, by the unified OAM management center, network OAM status detection signaling to the network entity; and
wherein the network OAM status detection signaling is generated according to the unified OAM management data model, and is related to the network technology that is used by the network entity.

5. The method according to claim 4, wherein before sending the network OAM status detection signaling, the method further comprises:
receiving, by the unified OAM management center, a network OAM status detection requirement from an application device, the network OAM status detection requirement being unrelated to a network technology;
determining, by the unified OAM management center, a feature of the network technology that is used by the network entity; and
converting, based on the unified OAM management data model and the feature by the unified OAM management center, the network OAM status detection requirement into the network OAM status detection signaling.

6. The method according to claim 1, wherein the unified OAM management data model further comprises one or more of:
network layer information of network layers comprised in a path where network OAM status is detected, first correlation information between the network layers that are comprised in the path, relative position information of the path and another path, or second correlation information between the path and the another path.

7. The method according to claim 1, wherein processing the network OAM status information comprises:
when the network OAM status information is based on the unified OAM management data model, determining, by the unified OAM management center according to an object of the unified OAM management data model, that a problem occurs in a first path through which a data stream is transmitted between the network entity and another network entity; and
sending, by the unified OAM management center, a notification message to the network entity notifying the network entity to switch the data stream from the first path to a second path where no problem occurs for transmission.

8. The method according to claim 1, wherein processing the network OAM status information comprises:
when the network OAM status information is based on the OAM management data model that corresponds to the network technology used by the network entity, converting, based on the unified OAM management data model by the unified OAM management center, the network OAM status information into an object of the unified OAM management data model, and determining, according to the object of the unified OAM management data model, that a problem occurs in a first path through which a data stream is transmitted between the network entity and another network entity; and
sending, by the unified OAM management center, a notification message to the network entity notifying the network entity to switch the data stream from the first path to a second path where no problem occurs for transmission.

9. A unified operation, administration, and maintenance (OAM) management center, comprising:
a processor; and
a non-transitory computer readable medium which contains computer-executable instructions;
wherein the processor is configured to execute the computer-executable instructions to:
receive detected network OAM status information sent by a network entity, wherein the network OAM status information is based on a unified OAM management data model or is based on an OAM management data model corresponding to a network technology used by the network entity, and the network OAM status information describes a network OAM status detected by the network entity; and
process, based on the unified OAM management data model, the network OAM status information; and
wherein the unified OAM management data model comprises a unified parameter, wherein the unified parameter is a parameter of an OAM management data model corresponding to different network technologies.

10. The unified OAM management center according to claim 9, wherein the processor is configured to further execute the computer-executable instructions to:
before the network OAM status information is processed, obtain the unified parameter; and
generate the unified OAM management data model according to the unified parameter by using an Internet Engineering Task Force Yet Another Next Generation (IETF YANG) Data Model format.

11. The unified OAM management center according to claim 9, wherein the processor being configured to receive the network OAM status information comprises the processor being configured to:
receive data that is in an Extensible Markup Language (XML) form and that is transferred by the network entity using a Network Configuration Protocol (NETCONF);
wherein the data in the XML form is converted from an object of the unified OAM management data model, wherein the object of the unified OAM management data model carries the network OAM status information, and the object of the unified OAM management data model is obtained by the unified OAM management center by filling and/or extending, according to the detected network OAM status information, a related parameter in the unified OAM management data model.

12. The unified OAM management center according to claim 9, wherein the processor is configured to further execute the computer-executable instructions to:
before receiving the network OAM status information, send network OAM status detection signaling to the network entity, wherein the network OAM status detection signaling is generated according to the unified OAM management data model, and is related to the network technology that is used by the network entity.

13. The unified OAM management center according to claim 12, wherein the processor is configured to further execute the computer-executable instructions to:
before sending, the network OAM status detection signaling, receive a network OAM status detection requirement from an application device, the network OAM status detection requirement being unrelated to a network technology;

determine a feature of the network technology that is used by the network entity; and convert, based on the unified OAM management data model and the feature by the unified OAM management center, the network OAM status detection requirement into the network OAM status detection signaling.

14. The unified OAM management center according to claim 9, wherein the unified OAM management data model further comprises one or more of:
network layer information of network layers comprised in a path where network OAM status is detected, first correlation information between the network layers that are comprised in the path, relative position information of the path and another path, or second correlation information between the path and the another path.

15. The unified OAM management center according to claim 9, wherein the processor being configured to process the network OAM status information comprises the processor being configured to:
when the network OAM status information is based on the unified OAM management data model, determine, by the unified OAM management center according to an object of the unified OAM management data model, that a problem occurs in a first path through which a data stream is transmitted between the network entity and another network entity; and
send a notification message to the network entity notifying the network entity to switch the data stream from the first path to a second path where no problem occurs for transmission.

16. The unified OAM management center according to claim 9, wherein the processor being configured to process the network OAM status information comprises the processor being configured to:
when the network OAM status information is based on the OAM management data model that corresponds to the network technology used by the network entity, convert, based on the unified OAM management data model by the unified OAM management center, the network OAM status information into an object of the unified OAM management data model, and determine, according to the object of the unified OAM management data model, that a problem occurs in a first path through which a data stream is transmitted between the network entity and another network entity; and
send a notification message to the network entity notifying the network entity to switch the data stream from the first path to a second path where no problem occurs for transmission.

17. A network entity, comprising:
a processor; and
a non-transitory computer readable medium which contains computer-executable instructions;
wherein the processor is configured to execute the computer-executable instructions to:

detect a network operation, administration, and maintenance (OAM) status; and
send network OAM status information describing the network OAM status to a unified OAM management center based on a unified OAM management data model or based on an OAM management data model corresponding to a network technology used by the network entity;
wherein the unified OAM management data model comprises a unified parameter, and wherein the unified parameter is a parameter of an OAM management data model corresponding to different network technologies.

18. The network entity according to claim 17, wherein the processor is configured to further execute the computer-executable instructions to:
before detecting the network OAM status, receive network OAM status detection signaling sent by the unified OAM management center, wherein the network OAM status detection signaling is generated based on the unified OAM management data model by the unified OAM management center and is related to the network technology used by the network entity; and
wherein detecting the network OAM status further comprises: detecting the network OAM status according to the network OAM status detection signaling.

19. The network entity according to claim 17, wherein the processor is further configured to execute the computer-executable instructions to:
receive OAM configuration information that corresponds to information of an OAM capability supported by the network entity and that is sent by the unified OAM management center; and
wherein the OAM configuration information is generated by adding, based on the unified OAM management data model, configuration information related to the network technology used by the network entity.

20. The network entity according to claim 17, wherein the processor is configured to send data that is in an Extensible Markup Language (XML) form and that is transferred using a Network Configuration Protocol (NETCONF), wherein the data in the XML form is converted from an object of the unified OAM management data model, the unified OAM management data model is generated by using an Internet Engineering Task Force Yet Another Next Generation (IETF YANG) Data Model format, and the object of the unified OAM management data model carries the network OAM status information.

21. The method according to claim 1, the network OAM status comprises at least one of a link fault or degraded link performance.

22. The method according to claim 21, the degraded link performance comprises one or any combination of a link loss, a link packet loss, reduced link connectivity, or increased link latency.

* * * * *